Feb. 23, 1965    C. M. SCHOTT, JR    3,170,653
WINDER
Filed April 29, 1963    2 Sheets-Sheet 1

3,170,653
WINDER
Charles M. Schott, Jr., Gloucester, Mass., assignor, by mesne assignments, to The First National Bank of Boston
Filed Apr. 29, 1963, Ser. No. 277,412
7 Claims. (Cl. 242—64)

This invention relates to phantom axis winders.

The phantom axis winder is employed where it is desired to form large rolls from a continuously moving web. In the prior art such a winder has taken the form of a turret carrying at least two driven spindles spaced apart from the turret axis. Stub shafts each mounted on double bearings have supported the turret leaving the center of the turret open for the formation of the roll. Because the ends of the turret must be turned together in indexing the formed roll to the removal position and the fresh spindle to the wind position a complicated gear mechanism and transmission have been employed, extending the full width of the winder, for turning both ends of the turret together. Because of this complicated drive mechanism and the double bearings phantom axis turrets have cost nearly twice as much as conventional turret winders.

The principal object of this invention is to provide a phantom axis turret winder that is much less expensive than has heretofore been known.

Figure 1:
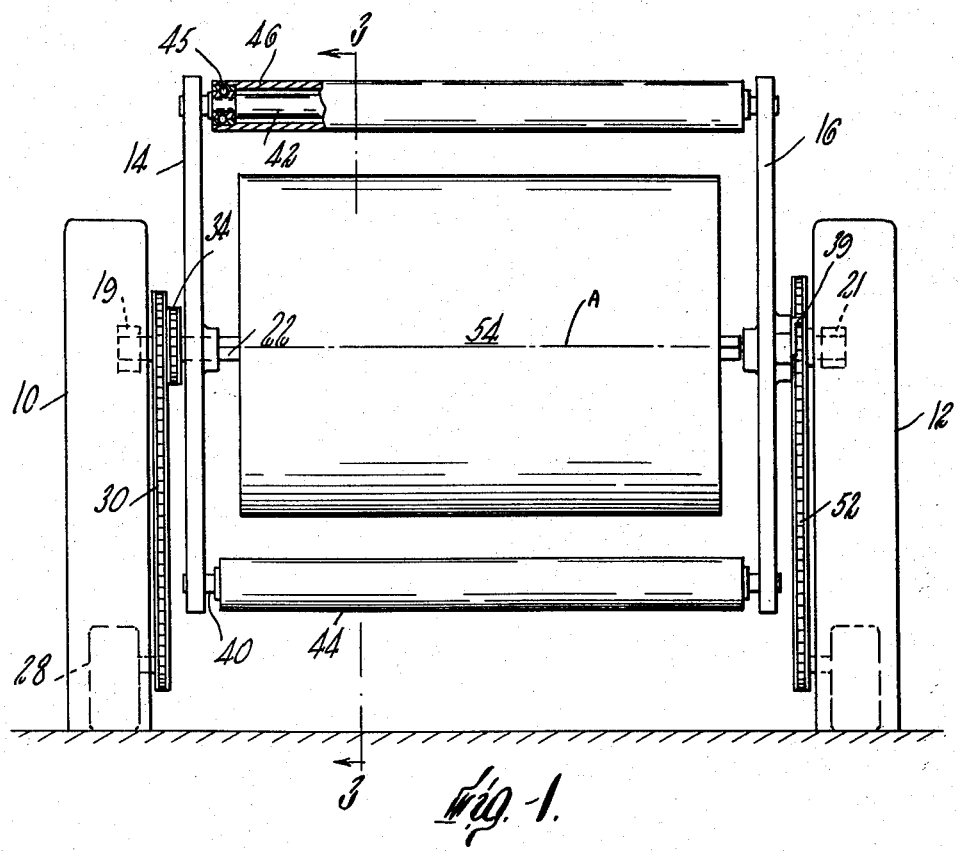
FIG. 1 is a side view of the phantom axis turret winder of the invention.
Figure 2:
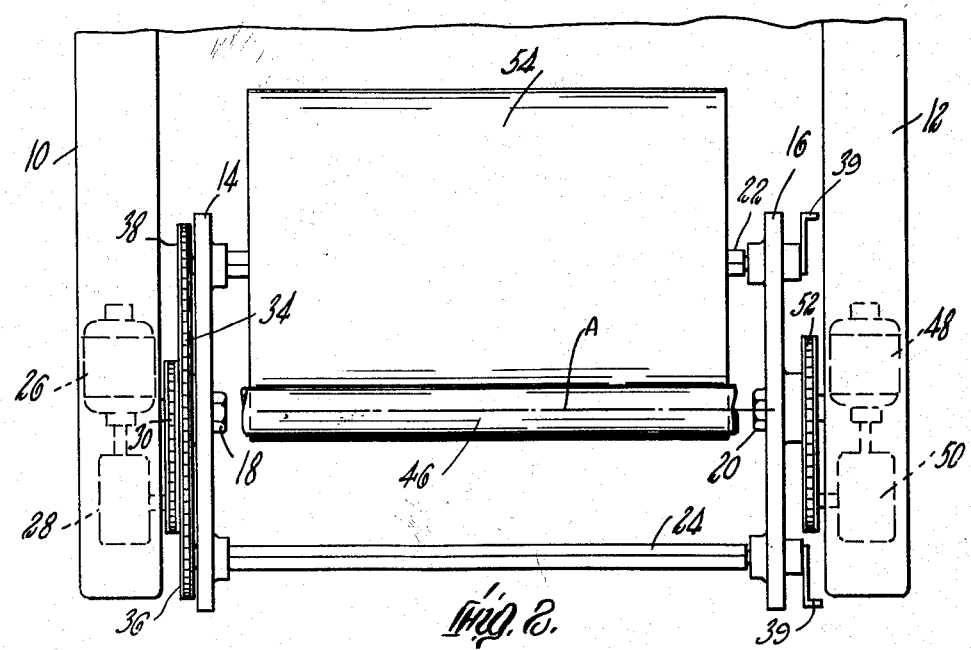
FIG. 2 is a plan view of the embodiment of FIG. 1.

Referring to the drawings, the winder of the invention comprises two spaced apart end support members 10, 12 that mount two spaced apart turret end plates 14, 16 by two stub shafts 18, 20. Each stub shaft is held in only one bearing 19 and 21 respectively. Two take-up spindles 22, 24 are mounted betwen the turret end plates 14, 16. A means to drive the take-up spindles is provided, here comprising a drive motor 26, a reduction gear unit 28 driven by the motor and driving a first drive chain 30 that extends from the reduction gear unit to the axis A of the turret plates. A sprocket device 32 is driven by the first drive chain 30, and drives second drive chain 34 that extends over spindle sprockets 36 and 38 that drive the live ends of the spindles. The dead ends of the spindles are provided with means 39 for releasing the spindles to remove them.

The novelty of the invention lies in the use of at least one rigid drive member rigidly joining the two turret end plates, the drive member being spaced from the axis of rotation of the turret, and spaced from the spindles. An important aspect of the invention is that each rigid drive member is spaced further from the axis of rotation of the turret end plates than is the spindle, and the spacing of the drive member from each spindle is greater than the spacing of the corresponding spindle from said axis. In the most advantageous form, as shown in the drawings, the invention employs at least two spaced apart rigid drive members 40 and 42 lying on a plane through the axis of rotation A of the turret that is at right angles to the plane lying through the axis of the turret that passes through the take-up spindles 22 and 24. Two rotatable idlers or sleeves 44 and 46 are concentric with the rigid drive members 40 and 42 respectively, adapted to turn freely when engaged by the web. Advantageously each rigid drive member 40, 42 is a rigid shaft and each sleeve is mounted by bearings 45 directly thereto.

The apparatus also employs a second drive motor 48, reduction gear unit 50 and transmission chain 52 in driving engagement with only one turret end plate 16 for indexing the turret when desired.

Because of the rigid drive members 40, 42, only one bearing is required at each end of the turret and only one turret end plate needs to be directly driven.

Figure 3:
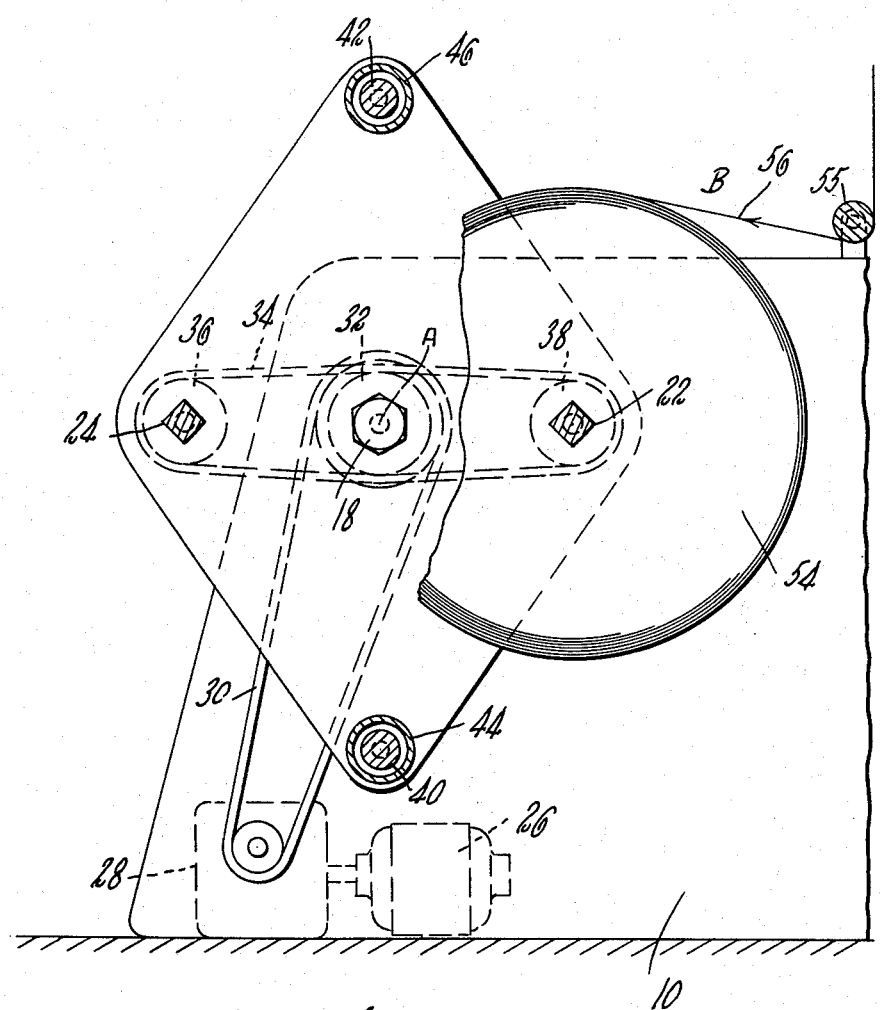
FIG. 3 is a vertical cross-sectional view taken on the line 3—3 of FIG. 1.

Referring to FIG. 3 in operation the spindle 22 is turned about its own axis while a roll of web 54 is formed thereon from web moving through web path B defined by idler roll 55. When the desired roll size is reached the turret is indexed 180° to carry spindle 22 to the position occupied by the spindle 24 in FIG. 3, so that the roll 54 can be removed, and to carry spindle 24 to the position occupied by spindle 22 in FIG. 3 so that it can commence to form a roll. In thus indexing the turret the rigid drive member 40 passes across the web path 56, but this has no adverse effect since an antifriction web contacting surface is provided, here in the form of an idler roll or sleeve so that the web is not damaged. After a roll is formed on spindle 24, the device is indexed in the same direction and the entire operation repeated.

It will be obvious that certain details of the invention can be varied within its spirit and scope. For instance, if the turret is indexed alternately clockwise and counter-clockwise and the spindles turned in opposite directions then only one of the rigid supporting members will cross the web path, hence only one concentric idler member is required. Or if one rigid supporting member is made strong enough only one need be employed. Also, where the rigid supporting member passes across a web that moves slowly or is otherwise not sensitive to friction it is possible to provide an anti-friction coating such as a fluro-carbon plastic upon the rigid supporting member itself for slidable engagement with the web rather than employing an idler roll.

What is claimed is:

1. A phantom axis winder comprising two spaced apart turret end plates mounted to support structure by axially aligned stub shaft means, the space between the turret end plates along the stub shaft axis being open to be occupied by a roll, at least two spindles supported by said turret end plates, said spindles spaced apart from the stub shaft axis and from each other and adapted to form rolls from web proceeding through a web path, drive means for the spindles adapted to turn said spindles in the direction to take up incoming web and drive means for indexing the turret end plates together wherein only a first one of the turret end plates is directly driven by said drive means for indexing the turret end plates, a rigid drive member extending between the two turret end plates and joining them rigidly together, said rigid drive member spaced from the axis of rotation of said turret end plates and from said spindles, said rigid drive member adapted to drive the second turret end plate, the nearest portion of said rigid drive member to each of said spindles being spaced from said spindle a distance substantially greater than the distance between said spindle and said stub shaft axis, said spindles being spaced from each other a distance substantially greater than the distance of either from said stub shaft axis, but substantially less than the diameter of the largest roll formable thereon, whereby a fully formed roll can extend substantially beyond said axis without interference with said rigid drive member.

2. A phantom axis winder comprising two spaced apart turret end plates mounted to support structure by axially aligned stub shaft means, the space between the turret end plates along the stub shaft axis being open to be occupied by a roll, at least two spindles supported by said turret end plates, said spindles spaced apart from the stub shaft axis and from each other and adapted to form rolls from web proceeding through a web path, drive means for the spindles and drive means for indexing the turret end plates together wherein only a first one of the turret end plates is directly driven by said drive means for indexing the turret end plates, a rigid drive member extending between the two turret end plates and joining them rigidly together, said rigid drive member spaced from the axis of rotation of said turret end plates and from said spindles, said rigid drive member adapted to drive the second turret end plate, the rigid drive member positioned to move across the path of web and provided with a web engaging surface.

3. The winder of claim 2 wherein said web engaging surface is defined by an idler roll surrounding said rigid drive member.

4. The winder of claim 2 wherein the turret plates are adapted to be indexed always in the same direction.

5. The winder of claim 4 wherein two rigid drive members are employed spaced diametrically from the axis of rotation of the turret plates.

6. The winder of claim 5 having only two spindles, the spindles diametrically opposed relative to the axis of rotation of said turret end plates, and the line of centers through said rigid drive members is substantially perpendicular to the line of centers of said spindles.

7. The winder of claim 1 wherein said two spindles are located substantially in diametrically opposite positions relative to said axis and the rigid drive member is spaced further from the axis of rotation of the turret end plates than is the spindle.

References Cited by the Examiner
UNITED STATES PATENTS
1,608,193  11/26  Stevens _____ 242—64
FOREIGN PATENTS
529,327  7/31  Germany.

MERVIN STEIN, *Primary Examiner.*